(12) United States Patent
Bellini et al.

(10) Patent No.: US 12,530,399 B1
(45) Date of Patent: Jan. 20, 2026

(54) ARTIFICIAL INTELLIGENCE MODEL SUPPORTING TASKS OF DIFFERENT PROGRAM CODES

(71) Applicant: Amazon Technologies, Inc., Seattle, WA (US)

(72) Inventors: Vito Bellini, Berlin (DE); Zhan Shi, Seattle, WA (US); Emanuele Coviello, La Jolla, CA (US); Fabian Moerchen, Bainbridge, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/541,352

(22) Filed: Dec. 15, 2023

(51) Int. Cl.
*G06F 16/635* (2019.01)
*G06F 16/638* (2019.01)

(52) U.S. Cl.
CPC .......... *G06F 16/635* (2019.01); *G06F 16/638* (2019.01)

(58) Field of Classification Search
CPC .............................. G06F 16/635; G06F 16/638
See application file for complete search history.

(56) References Cited

U.S. PATENT DOCUMENTS

| | | | |
|---|---|---|---|
| 6,662,231 B1 * | 12/2003 | Drosset ................ | H04L 67/306 709/227 |
| 2004/0107821 A1 * | 6/2004 | Alcalde ................ | G10H 1/0058 84/608 |
| 2008/0021851 A1 * | 1/2008 | Alcalde .............. | G06Q 30/0603 706/21 |
| 2009/0100094 A1 * | 4/2009 | Verdaguer ............. | G06F 16/735 |
| 2012/0166377 A1 * | 6/2012 | Sathish .................. | G06Q 10/00 706/47 |
| 2018/0336479 A1 * | 11/2018 | Guttmann ............ | G06V 10/764 |
| 2020/0364588 A1 * | 11/2020 | Knox ..................... | G06V 40/20 |

* cited by examiner

*Primary Examiner* — Cheyne D Ly
(74) *Attorney, Agent, or Firm* — Kilpatrick Townsend & Stockton LLP

(57) ABSTRACT

Techniques are described herein for using an artificial intelligence (AI) model to support tasks for different program codes. For example, a computer system can determine a request of an application that is executing on a device. The application can include program codes that each provide content functions and present content at a user interface for the application. The request may be associated with contextual data and user data and may indicate content entities for a first program code. The computer system can input the content entities, the contextual data, and the user data into an AI model that is trained on historical data associated with the content functions. The AI model can output a relevance score or an embedding vector for the content entities that can be used in performing the first content function and presenting the content entities on the user interface.

20 Claims, 13 Drawing Sheets

ARTIFICIAL INTELLIGENCE MODEL SUPPORTING TASKS OF DIFFERENT PROGRAM CODES

BACKGROUND

As more content has been published online, it has become increasingly challenging for users to easily find the content for which they are searching. For instance, a user may input a search query online for a particular item, expecting relevant results to be returned. Despite efforts to improve recommendation systems, online systems may return results that are not personalized to what the user expects or desires.

BRIEF DESCRIPTION OF THE DRAWINGS

Various embodiments in accordance with the present disclosure will be described with reference to the drawings, in which.

DETAILED DESCRIPTION

Figure 1:
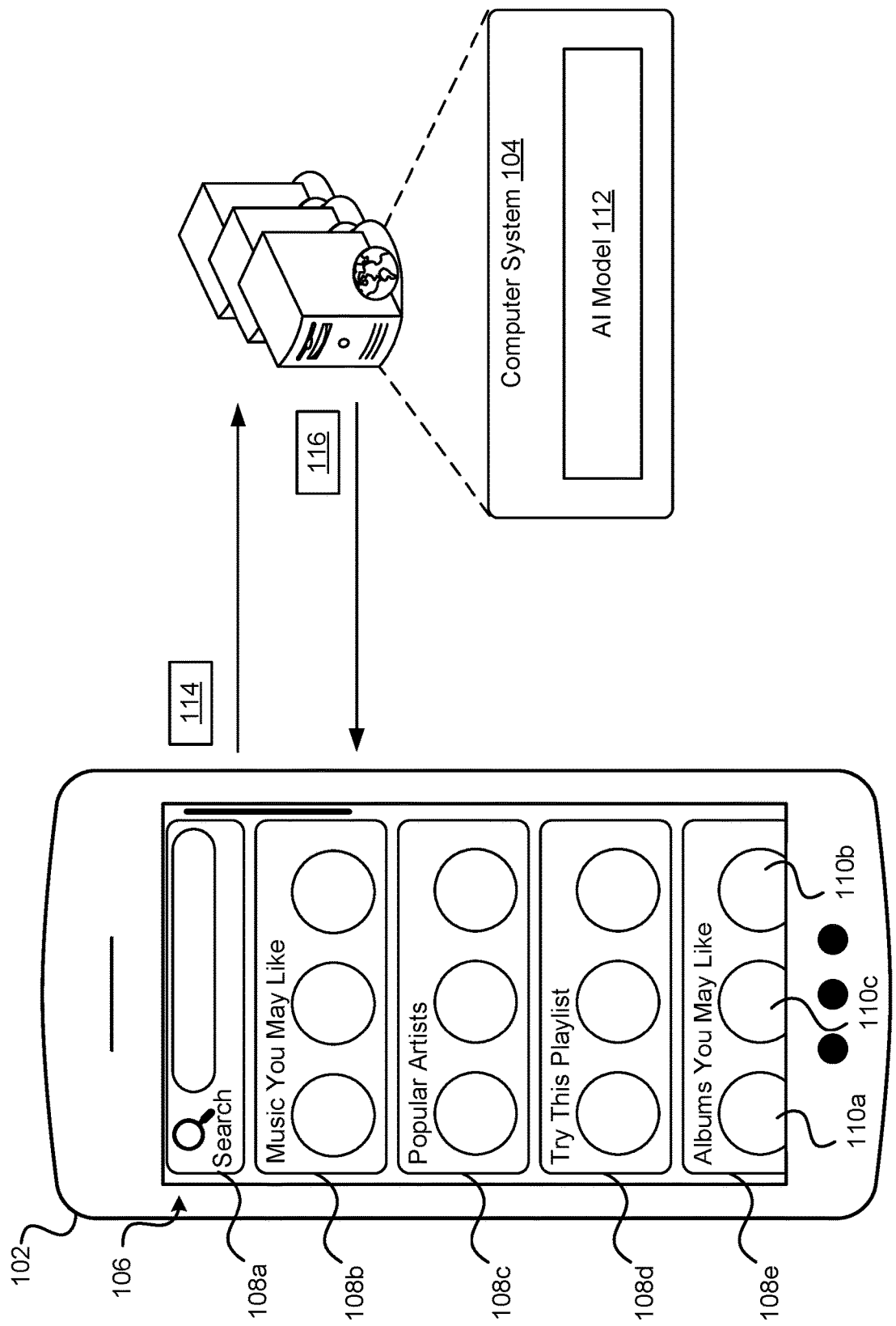
FIG. 1 illustrates an example of a device displaying a user interface for an application presenting content from different program codes using output from an artificial intelligence model, according to some embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, an artificial intelligence model that can support tasks of different program codes of an application. Each program code may provide personalized content at a user interface of the application. It is common for content providers to offer a catalog that contains millions of content entities (e.g., songs, movies, books, articles, podcasts, videos, etc.) which are consumed by millions of users. When providing content recommendations or search results to a user, it may be computationally infeasible to compute a relevance score between the user and each content entity in real-time. To mitigate this challenge, a two-stage recommender can, in the first stage, compute a list of N content entities and then, in the second stage, rank the N content entities based on user data and contextual data. In some instances, although each of the different program codes may perform different techniques using different data in the first stage, each of the different program codes for the application may perform this second stage of ranking content entities in a similar manner. Embodiments described herein involve an artificial intelligence model trained to generate an output that can be provided to multiple different program codes to rank content entities. The artificial intelligence model can be a unified model that is used in addition to or in place of recommender models of the program codes by unifying ranking of content entities. That is, the artificial intelligence model can be a unification of different recommender models used by various program codes, and in some examples may be trained on inputs and outputs for the recommender models. The output may be relevance scores for each of the N content entities, an embedding vector indicating, for each of the N content entities, a relevance score for each of the program codes, a ranking of the N content entities, or a combination thereof. The different program codes can present their respective content entities (e.g., their ranked content entities) according to this output.

To illustrate, consider an example of an application that a user can interact with via a device to search for and play music. The application may include multiple program codes executing different functions of the application. Examples of the program codes can include a search engine that displays search results of musical artists, songs, albums, etc.; a recommender that shows a recommended list of songs; a playlist organizer that can display a list of songs from a playlist; and the like. Each program code can generate a set of content entities to output to the user. For example, the search engine program code may generate a set of search results based on a search query inputted by the user and, in some examples, user data and contextual data. The recommender program code can generate a set of recommended songs to the user based on user data and contextual data. The playlist organizer can generate a recommended playlist of songs personalized to the user.

To optimize user experience, the set of songs (or search results, artists, albums, playlists, etc.) can be ranked according to their relevance to the user. This ranking can be determined using an artificial intelligence (AI) model. The AI model may include a neural network, such as a feed-forward neural network, that is trained to predict a relevance score of a content entity for a given user. The relevance score can be a likelihood of a user interaction with the content entity. Some or all of the different program codes can execute the relevance score to determine rankings for their respective sets of content entities (e.g., search results, recommended songs, recommended playlists), even though the methods for generating sets of content entities and the input data used to generate the sets of content entities may differ between program codes.

In some examples, the relevance score output by the AI model can be directly used to rank the set of content entities. For example, the search engine program code may receive relevance scores for each search result from the AI model and may present the search results at the user interface in order of highest relevance score to lowest relevance score. In other examples, a program code may include its own ranking model that uses the relevance score from the AI model as input. For example, a song recommender program code may include a different AI model that receives input including the relevance score, contextual data, and user data to generate a ranking of recommended songs. Inputting the relevance score from the AI model may provide improved personalization for the song recommender's AI model.

Embodiments of the present disclosure provide several technological advantages over existing systems. In existing systems, different program codes for an application may execute or interface with different artificial intelligence models that can generate personalized ranking of content for that specific program code. In some examples, embodiments described herein can reduce latency of the application by replacing one or more ranking models for program codes with a multi-task AI model that is jointly trained on historical data for different program codes to generate an output that can used by multiple different program codes to rank content. Rather than running many recommender models for many program codes in parallel, a single, unified AI model can be used and combined with light-weight logic to produce similar or improved recommendations (e.g., compared to the recommender models for the program codes). This can reduce computing power involved in generating recommendations. Additionally or alternatively, the output from the AI model can be provided as input to the program code models to simplify input and increase accuracy. For example, the output from the AI model can be a summarization (e.g., a single relevance score) of the large set of features previously provided as input to the program code models. This can significantly reduce latency of the application by reducing input signals to models and simplifying the production stack.

Embodiments described herein can also provide faster migration of new features for different program codes. Different program codes may use different signals as input to their associated models. While adding more input signals can increase the personalization of the output, this may come at a cost. For example, new types of input may need to be tested for each of the different program code models (e.g., music searching, playlist recommenders). Testing each individual model for different program codes can be computationally expensive and time-consuming. Additionally, adding more personalization inputs to the various models can decrease overall latency for the computing system executing the application, particularly when operations cannot be parallelized. The AI model described herein can provide output that can be broadly applied to many different program codes. This can allow new input signals to be quickly and efficiently tested across multiple program codes.

In the interest of clarity of explanation, embodiments of the present disclosure are described with respect to a music application with various program codes that perform functions involving recommending, searching, and playing music. Embodiments of the present disclosure may similarly and equivalently apply to any application that may perform functions involving outputting content.

FIG. 1 illustrates an example of a device 102 displaying a user interface 106 for an application presenting content from different program codes using output from an artificial intelligence (AI) model 112, according to some embodiments of the present disclosure. The AI model 112 may be a multi-task model that can be trained to generate ranking outputs that can be used by multiple different program codes. The device 102 may be operable by a user. In an example, the device 102 can be a computing device that is capable of supporting various computing services. Examples of the device 102 can include a mobile device, a tablet, a laptop, a desktop, a multimedia device, a smart speaker, or any other type of suitable computing device. In the illustration of FIG. 1, the device 102 is a mobile device that is communicatively coupled (e.g., via the Internet) to a computer system 104 executing the AI model 112. In some examples, the application may be hosted on the device 102, the computer system 104, or another computing system (not pictured). Although the computer system 104 executing the AI model 112 is illustrated in FIG. 1 as being separate from device 102, in some examples the device 102 may execute the AI model 112 and/or the application.

The application can include program codes that can perform various music functions, such as presenting content on the user interface 106. For example, a first program code can perform a first content function 108a of searching (e.g., the first program code is a search engine which with the user can interact to search for music content). A second program code can perform a second content function 108b, where this program code can be a song recommender that displays song recommendations on the user interface 106. A third program code can perform a third content function 108c, where this program code can be an artist recommender that displays artist recommendations on the user interface 106. A fourth program code can perform a fourth content function 108d, where this program code can be a playlist recommender that displays a recommended playlist of songs on the user interface 106. A fifth program code can perform a fifth content function 108e, where this program code can be an album recommender that displays album recommendations on the user interface 106. Each of the program codes can cause a display of a set of content entities (e.g., albums, songs, artists, playlists) at a user interface of the application. For example, the fifth content function 108e can display multiple albums (e.g., first content entity 110a, second content entity 110b, and third content entity 110c). The ranking of the content entities 110a-c can be determined by or based on output from the AI model 112.

For example, the user may enter a search query of "rock music" into the search engine (e.g., first content function 108a). The first program code may generate a set of songs associated with rock music to return to the user as search results. But it may be beneficial to personalize the display order to the user. Therefore, the application (via the device 102) may send a request 114 to the computer system 104 to generate relevance scores for the set of songs. In some examples, the request 114 may be an application programming interface (API) call from the device 102. The computer system 104 may provide the set of songs to the AI model 112 as Input. The AI model 112 can then generate an output indicating relevance scores for the set of songs. Higher relevance scores can indicate higher probabilities that the user will interact with a particular song. Therefore, it may be beneficial to rank the set of songs in the search result according to their relevance scores, such that the most relevant songs are displayed first. The computer system 104 can transmit a response 116 including the relevance scores back to the application (e.g., to the device 102). The response 116 can drive the presentation display for the first content function 108a on the user interface 106. For example, the response 116 can cause the first program code to perform the first content function 108a of displaying the search results in an order that is based on the relevance scores.

In another example, the application may send the request 114 in response to the application being opened on the device 102. For example, when the user selects the application on the device 102, the fifth program code can perform the fifth content function 108e of generating a set of albums (e.g., first content entity 110a, second content entity 110b, and third content entity 110c) to recommend to the user. The fifth program code can also transmit a request 114 to the computer system 104 to generate relevance scores for the set of albums. The computer system 104 can input the set of albums into the AI model 112, which can generate an output of relevance scores for the set of albums. For example, the first content entity 110a can have a highest relevance score, the third content entity 110c can have a next highest relevance score, and the second content entity 110b can have the lowest relevance score. These relevance scores can be transmitted back to the fifth program code as a response 116 to the request 114. The fifth program code can perform the fifth content function 108e of displaying the set of albums on the user interface 106 according to the relevance score. In the example illustrated in FIG. 1, the recommended albums can be ranked (from left to right) as first content entity 110a, third content entity 110c, and second content entity 110b.

In some examples, the request 114 may include sets of content entities for multiple different program codes. For example, the home page of the application may include multiple content functions (e.g., the song recommender, the artist recommender, the playlist recommender, the album recommender). Thus, opening the application may cause each of the home page program codes to generate respective sets of content entities. The request 114 may be a request for relevance scores for each of the respective sets of content entities. The computer system 104 can transmit a response 116 (e.g., a single response) with output from the AI model 112 that can be used by each of the home page program codes in ranking their respective sets of content entities. Although FIG. 1 is described with respect to a smartphone displaying a user interface 106, in other examples the content entities may be presented in other presentation formats. For example, the device may be a smart speaker that outputs audio communicating music search results in the ranking indicated by the response 116 from the AI model 112. In this example, the presentation format is an audible format, where the order in which the music search results are audibly output by the smart speaker is based on the output from the AI model 112.

Figure 2:
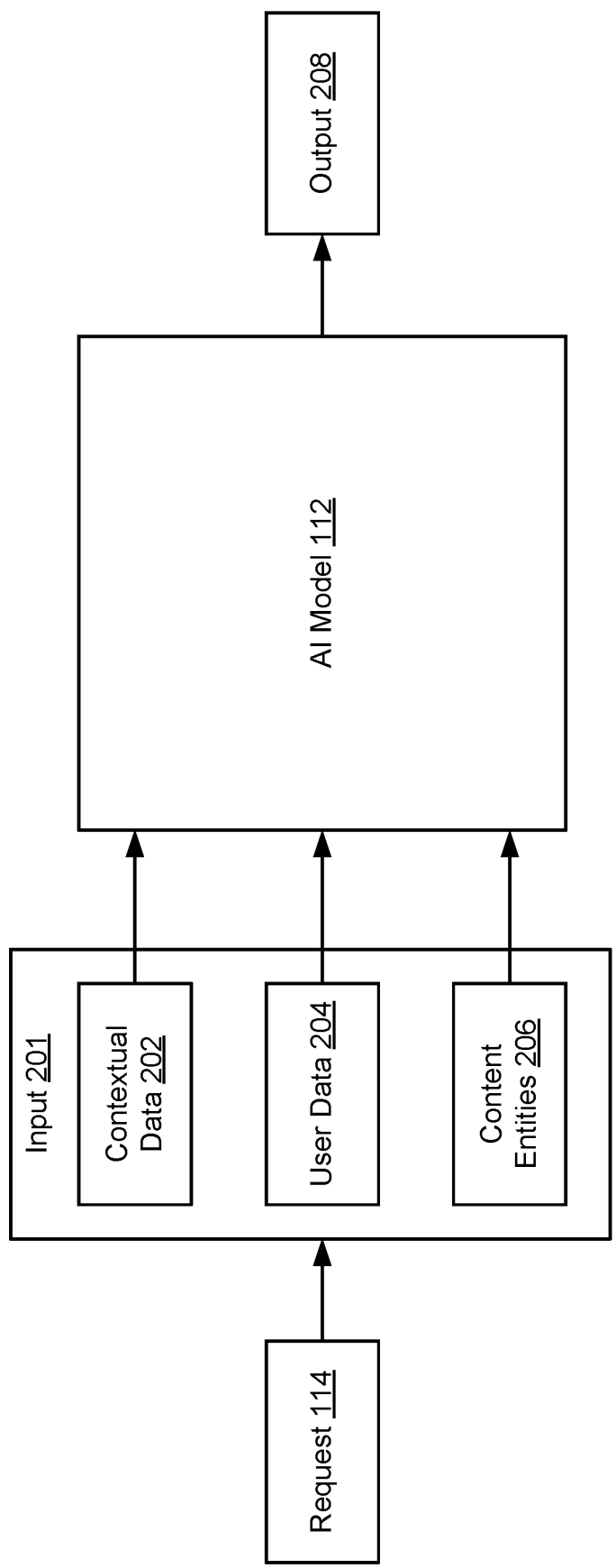
FIG. 2 illustrates an example block diagram of inputs to an artificial intelligence model supporting tasks of different program code, according to some embodiments of the present disclosure.

In some examples, additional information may be provided to the AI model 112 to generate the output. For example, FIG. 2 illustrates an example block diagram of inputs 201 to an artificial intelligence (AI) model 112 supporting tasks of different program codes, according to some embodiments of the present disclosure. The request 114 from the application may include content entities 206 (e.g., sets of search results, recommended songs, recommended artists, etc. that were generated by the program codes or any other system) that can be provided as input 201 to the AI model 112. In some examples, the request 114 may also include contextual data 202 and user data 204 to be provided as input 201. In other examples, the contextual data 202 and the user data 204 can be derived from the request 114. For example, the request 114 may include a user identifier for the application account associated with the user. The computer system 104 can access user data 204 and contextual data 202 that is associated with the user identifier.

The user data 204 can include the user's historical interaction with content entities in the application, such as a number of listens, likes, follows, skips, adds to playlists, etc. The user data 204 can also include other user information about the user, such as user characteristics (e.g., age, location, gender, etc.). The contextual data 202 can include other information that provides a context about any of the device, the request, the environment in which the device is, and the like. For example, the contextual data 202 can indicate popularity (e.g., across multiple users) of the content entity, the type of device used by the user to access the application, the time of day, the day of the week, user listening diversity, user tenure, etc. The request 114 may include content entities 206 from a single program code or multiple program codes. In some examples, the request 114 may combine the content entities from multiple program codes into an unlabeled list that does not specify which content entities are associated with which program codes. In other examples, the request 114 may include a list of content entities in association with their respective program codes.

Figure 3:
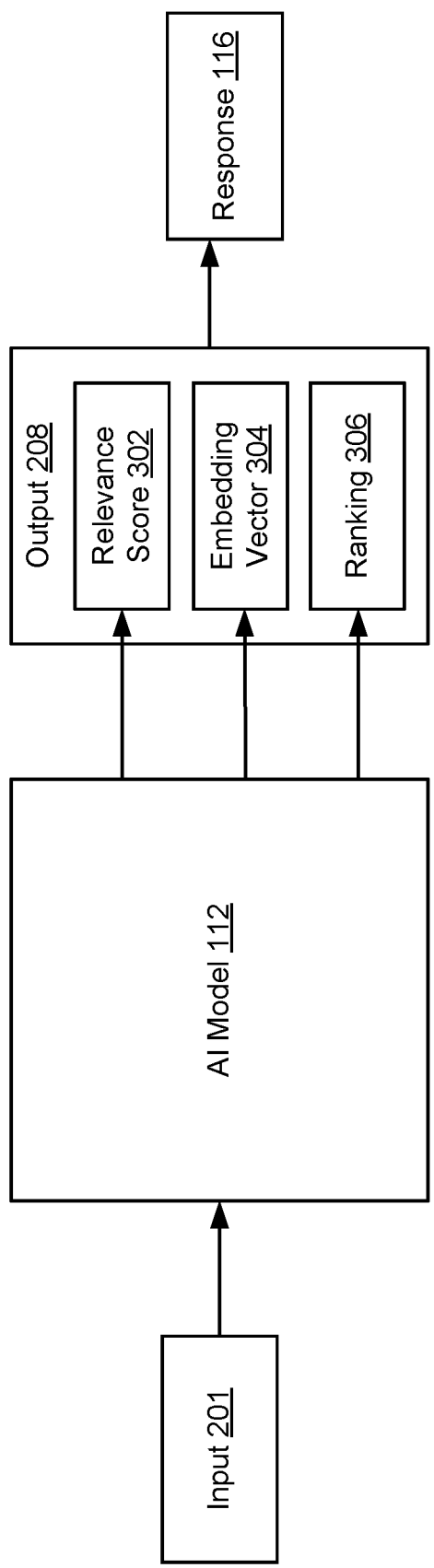
FIG. 3 illustrates an example block diagram of outputs from an artificial intelligence model supporting tasks of different program codes, according to some embodiments of the present disclosure.

The AI model 112 may generate an output 208 based on the input 201. For example, FIG. 3 illustrates an example block diagram of output 208 from the AI model 112 supporting tasks of different program codes, according to some embodiments of the present disclosure. The output 208 may include one or more of a relevance score 302, an embedding vector 304, or a ranking 306. The relevance score 302 may be a prediction (e.g., from 0 to 1) of a likelihood that a user will interact with the associated content entity. Each content entity provided in the input 201 can have an associated relevance score 302 indicated by the output 208. The ranking 306 may directly rank the content entities provided as input 201 (e.g., based on the relevance scores 302). The embedding vector 304 may be a vector of relevance scores that are tailored to the different program codes. That is, the embedding vector 304 for a particular content entity may include relevance scores that are specific to each program code that provided content entities in the request 114. Or the relevance scores in the embedding vectors may be tailored to different objectives, such as ranking to maximize relevance between the user and content entities, ranking to maximize diversity of content entities, ranking based on popularity of content entities in a region local to the user, etc. The kinds of relevance scores in the embedding vector 304 may be generated based on a request from a program code. The AI model 112 may be trained with historical data associated with a particular program code to generate a relevance score that is personalized to that program code.

Figure 4:
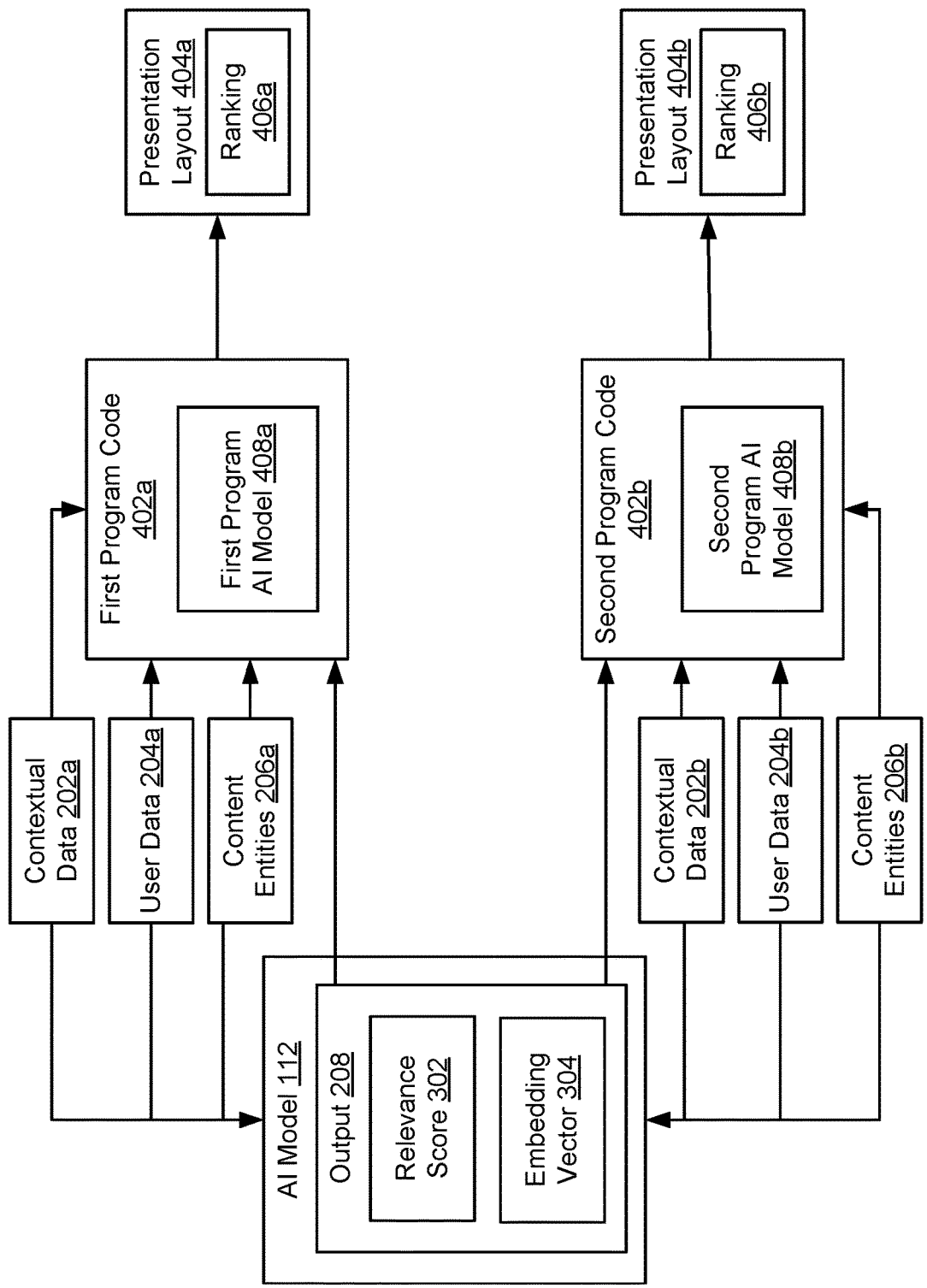
FIG. 4 illustrates an example block diagram of an artificial intelligence model providing output used by different program codes, according to some embodiments of the present disclosure.

The output 208 may be included in a response 116 to the request 114. The response 116 can be used by the different program codes to determine the presentation of the content entities on the user interface 106 depicted in FIG. 1. One example of this is shown in FIG. 4, which illustrates an example block diagram of the AI model 112 providing output 208 to different program codes 402a-b, according to some embodiments of the present disclosure. The AI model 112 may provide output 208 based on input that may or may not be provided by the first program code 402a or second program code 402b. For example, the first program code 402a may generate or access one or more of a list of content entities 206a, user data 204a, and contextual data 202a that are specific to the first program code 402a and are provided to the AI model 112 as input. Similarly, the second program code 402b may generate or access one or more of a list of content entities 206b, user data 204b, and contextual data 202b that are specific to the second program code 402b and are provided to the AI model 112 as input. In this example, the output 208 generated by the AI model 112 in response to the input can include a relevance score 302 for each content entity and/or an embedding vector 304 of relevance scores for each program code for each content entity. The AI model 112 can transmit the output 208 to the first program code 402a and the second program code 402b.

Each of the first program code 402a and the second program code 402b can use the output 208, and in some examples may also use additional information, to determine rankings 406a-b for their respective content entities 206a-b. For example, the first program code 402a may include or be associated with a first program AI model 408a (e.g., another artificial intelligence model that is different from AI model 112). The first program AI model 408a may be a ranking model that is specialized to the first program code 402a. The relevance score 302 and/or the embedding vector 304 can be provided as input to the first program AI model 408a for the first program code 402a. Additionally, contextual data 202a, user data 204a, and the first content entities 206a specific to the first program code 402a may also be provided as input to the first program AI model 408a. The contextual data 202a, user data 204a, and content entities 206a may be the same or different compared to the contextual data 202a, user data 204a, and content entities 206a that may have been provided to the AI model 112 as input. For example, the first program AI model 408a may receive different or additional inputs based on rules for the first program code 402a, such as user data 204a indicating how recently certain content entities were played by the user. In such an example, even though a particular content entity received a certain relevance score determined by the AI model 112, that particular content entity may not be included in ranking 406a generated by the first program code 402a. This is because first program code 402a may be trained to drop content entities that have been recently played. In some examples, the AI model 112 may receive a larger set of inputs compared to the first program AI model 408a, as the AI model 112 may be at least partially run offline. The first program AI model 408a may, in some examples, be run at runtime, and may therefore have a smaller set of inputs to reduce latency. The first program code 402a can execute the first program AI model 408a to generate a ranking 406a of the first content entities 206a for the first program code 402a. The first program code 402a can then cause the first content entities 206a to be arranged in a presentation layout 404a (e.g., on a user interface) according to the ranking 406a.

Providing the relevance score 302 and/or the embedding vector 304 as input to the first program AI model 408a can cause the first program AI model 408a to generate a ranking 406a of first content entities 206a that is more personalized to the user than an output generated by the first program AI model 408a based solely on the contextual data 202a, user data 204a, and first content entities 206a. In a similar manner, the second program code 402b may also include or be associated with a second program AI model 408b that is a ranking model specialized to the second program code 402b. The relevance score 302 and/or the embedding vector 304 can be provided as input to the second program AI model 408b. In some examples, contextual data 202b, user data 204b, and second content entities 206b specific to the second program code 402b can also be provided as input to the second program AI model 408b. The second program code 402b can execute the second program AI model 408b to generate a ranking 406b of the second content entities 206b. The second program code 402b can then cause the second content entities 206b to be arranged in a presentation layout 404b (e.g., on a user interface) according to the ranking 406b.

Figure 5:
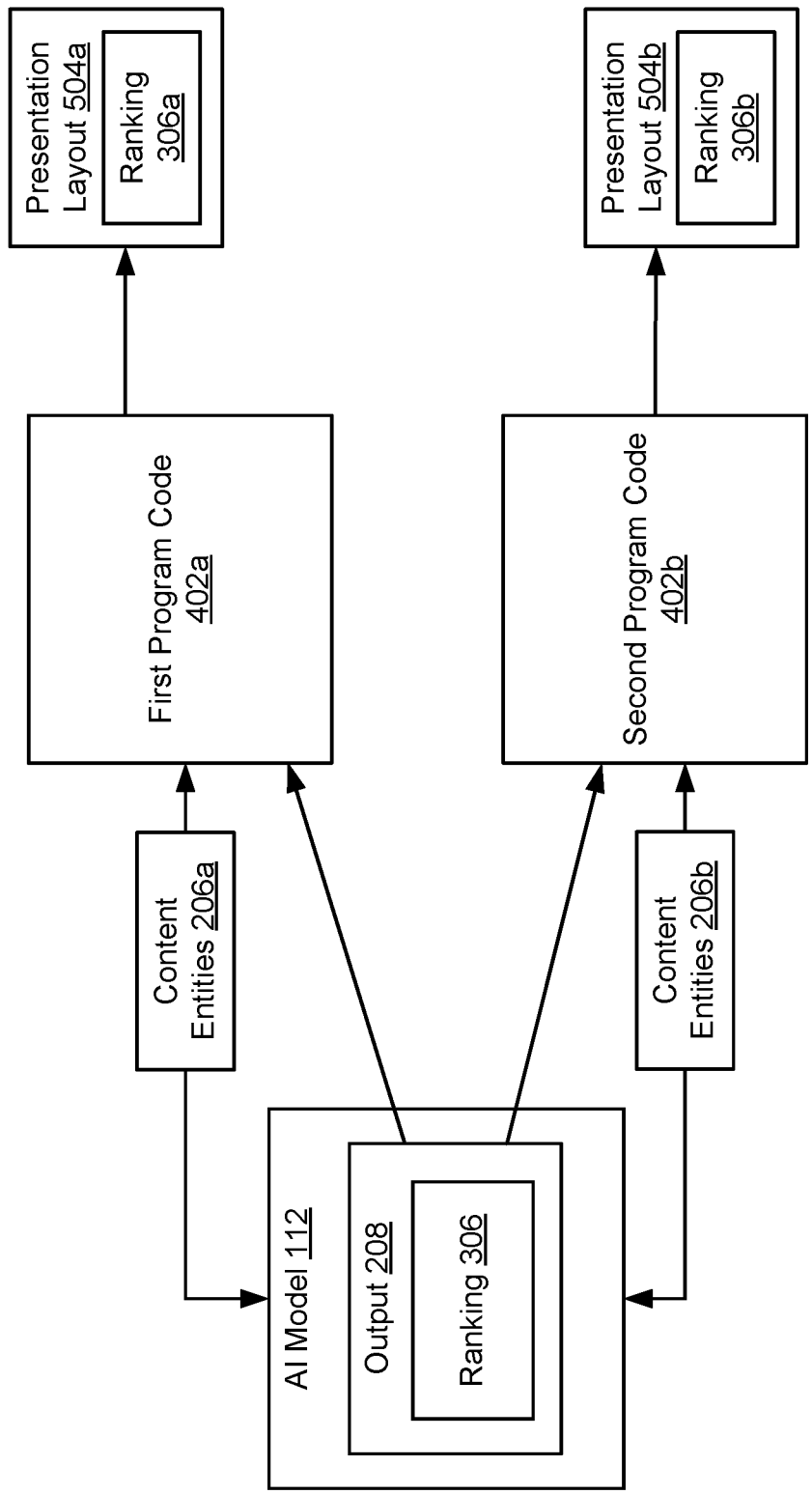
FIG. 5 illustrates another example block diagram of an artificial intelligence model providing output used by different program codes, according to some embodiments of the present disclosure.

FIG. 5 illustrates another example block diagram of the AI model 112 providing output 208 used by different program codes 402a-b, according to some embodiments of the present disclosure. In the example illustrated in FIG. 4, the output 208 generated by the AI model 112 may include a ranking 306 of the content entities provided as input to the AI model 112. The input to the AI model 112 can include first content entities 206a determined by the first program code 402a and second content entities 206b determined by the second program code 402b. In some examples, the first content entities 206a may be different than the second content entities 206b. For example, the first content entities 206a may be artist search results generated by the first program code 402a, while the second content entities 206b may be songs recommended by the second program code 402b.

In some examples, the first content entities 206a and the second content entities 206b can be provided as input to the AI model 112 without indication of their associated program code. That is, the AI model 112 may not be aware of the origin of a particular content entity. In other examples, the input may indicate which program code provided which content entities. The AI model 112 can then generate an output 208 indicating a ranking 306 of the first content entities 206a and the second content entities 206b. The ranking 306 may be a ranking of all combined entities (e.g., not separated based on origin), or a ranking for the first content entities 206a and a separate ranking for the second content entities 206b.

The output 208 can be provided to both the first program code 402a and the second program code 402b. The first program code 402a and the second program code 402b can perform their respective functions according to the ranking 306 in the output 208, without having to generate their own rankings. For example, the first program code 402a can cause the artist search results (e.g., first content entities 206a) to be displayed in the order indicated by the ranking 306. And the second program code 402b can cause the recommended songs (e.g., second content entities 206b) to be displayed in the order indicated by the ranking 306.

In examples where the ranking 306 is a ranking of all entities included in the first content entities 206a and the second content entities 206b, the first program code 402a can compare the ranking 306 to the list of first content entities 206a provided to the AI model 112 to extract a first ranking 306a for only the first content entities 206a. The first program code 402a can then cause the first content entities 206a to be displayed (e.g., on a user interface) and arranged in a presentation layout 504a according to the first ranking 306a. Similarly, the second program code 402b can compare the ranking 306 to the list of second content entities 206b provided to the AI model 112 to extract a second ranking 306b of the second content entities 206b. The second program code 402b can then cause the second content entities 206b to be displayed (e.g., on a user interface) and arranged in a presentation layout 504a according to the second ranking 306b.

Figure 6:
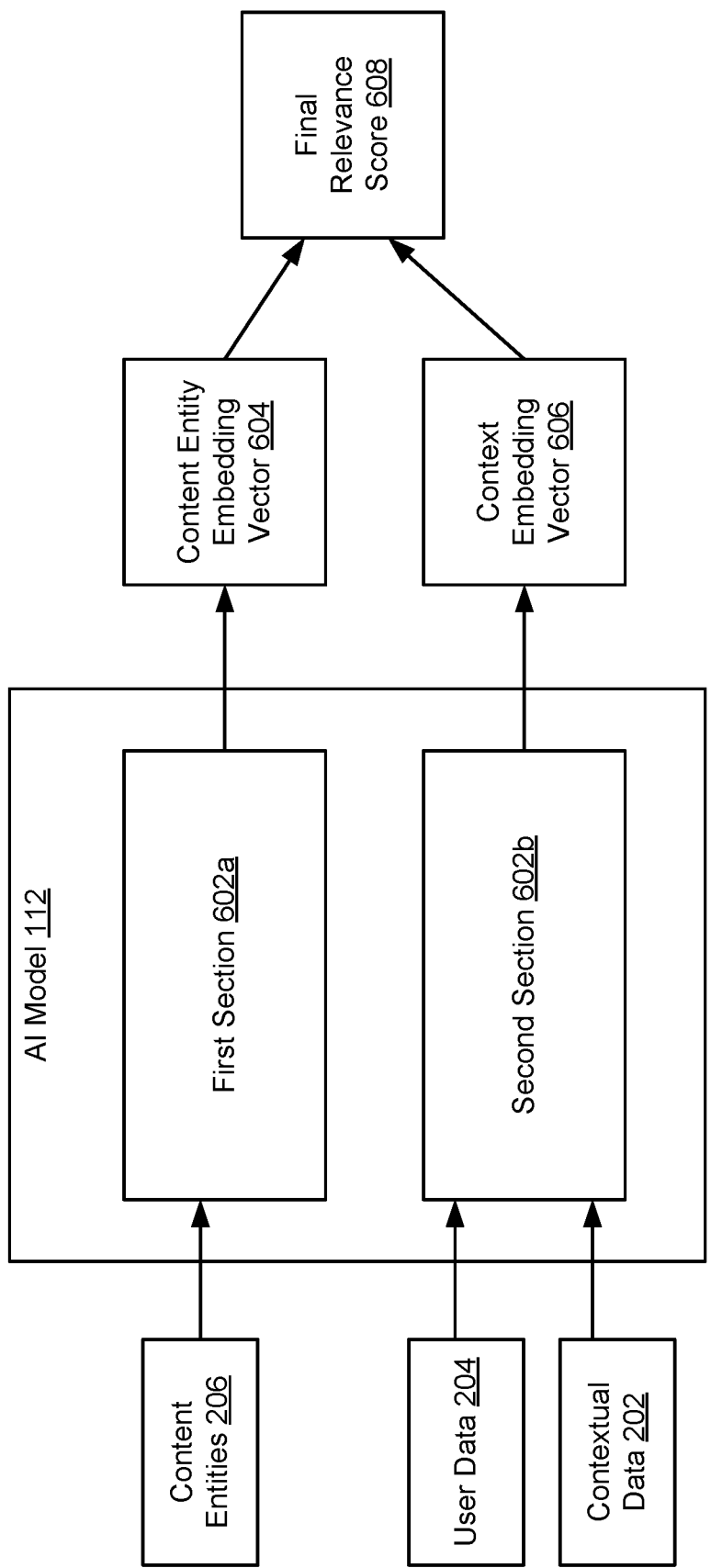
FIG. 6 illustrates an example block diagram of sections of an artificial intelligence model supporting tasks of different program codes, according to some embodiments of the present disclosure.

FIG. 6 illustrates an example block diagram of sections of an AI model 112 that can support tasks of different program codes, according to some embodiments of the present disclosure. The AI model 112 can include multiple sections or layers, such as a first section 602a and a second section 602b. In some examples, the sections 602a-b may have different inputs and may perform different functions in the AI model 112. In the example illustrated in FIG. 6, the first section 602a may receive content entities 206 as input, while the second section 602b may receive contextual data 202 and user data 204 as input. The first section 602a may generate embedding vectors of relevance scores that are specific to entities and the second section 602b may generate embedding vectors of relevance scores that are specific to context (e.g., the popularity of a content entity, or other such non-personalized information associated with the content entity) and particular users. Any other combination of inputs for the different sections 602a-b is possible.

In some examples, running some sections may involve a latency that is higher than may be desirable. Therefore, in some examples, the first section 602a and the second section 602b can be executed separately and at different times. For example, the first section 602a can be run offline, such as once per night. The first section 602a may compute relevance scores for entities that are likely to be recommended. The second section 602b can be run at runtime (e.g., when a request for a ranking is received from a program code). During an offline time period, the content entities 206 can be provided as input to the first section 602a. The first section 602a can generate an output based on the input that indicates a content entity embedding vector 604 (e.g., an embedding vector of relevance scores for a specific content entity). This content entity embedding vector 604 can be cached (e.g., by the computer system 104 of FIG. 1, the device 102, or any other device) for low latency retrieval until a request associated with the content entity is received.

For example, the AI model 112 may receive a request to generate an embedding vector for content entities 206. During runtime, an input of contextual data 202 associated with content entities 206 and user data 204 associated with the user receiving recommendations can be generated and provided to the second section 602b. The second section 602b can determine a context embedding vector 606 (e.g., embedding vector of relevance scores for the content entities 206 based on contextual data 202 and user data 204) in response to the input. At runtime, the content entity embedding vector 604 and the context embedding vector 606 can be combined to generate a final relevance score 608. For example, the final relevance score 608 can be a dot product of the content entity embedding vector 604 and the context embedding vector 606. The final relevance score 608 can be the output that is provided to the program codes that sent the request. Pre-processing part of the final relevance score 608 in this way can reduce latency and processing time involved in generating output.

Depending on system and latency requirements, several combinations of offline and runtime processing may be utilized. For example, a low latency system with incomplete coverage may involve caching large amounts of output from sections run offline, a medium latency system may involve performing online inference (e.g., at runtime) only for cache misses, and a high latency system may involve performing fully online inference (e.g., at runtime).

Figure 7:
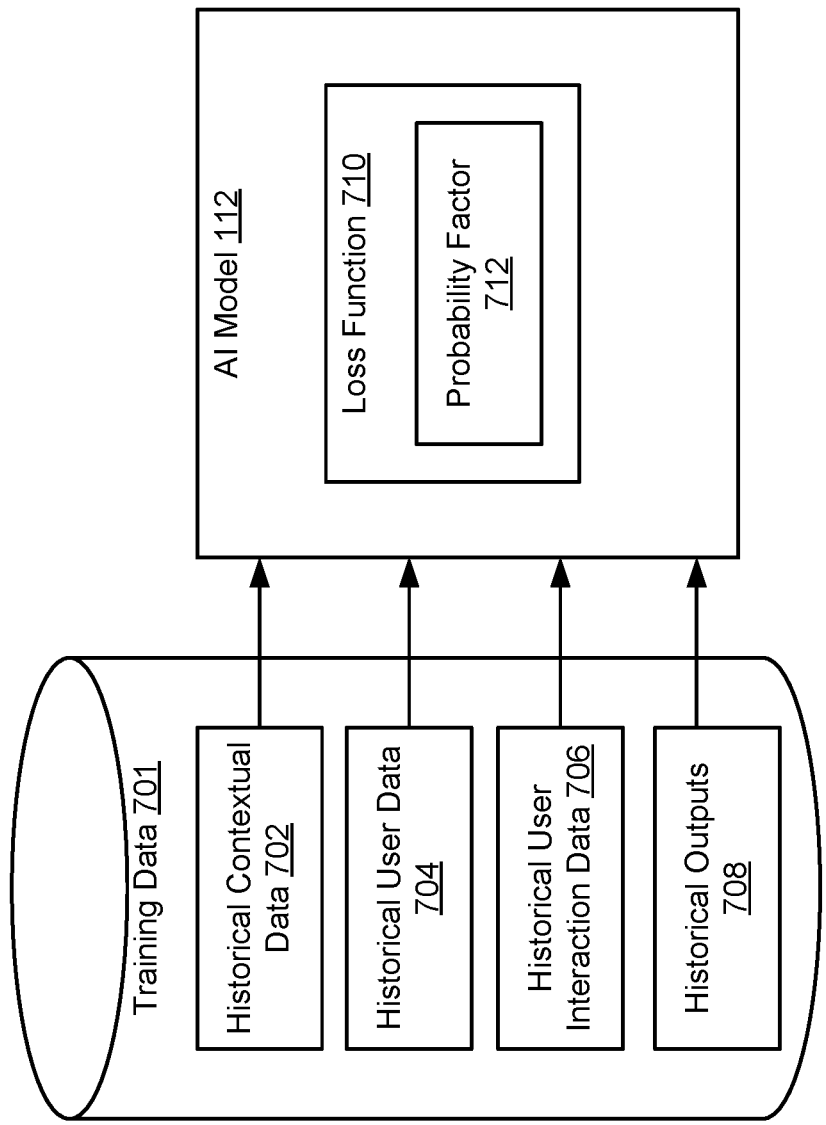
FIG. 7 illustrates an example block diagram of training data used to train an artificial intelligence model supporting tasks of different program codes, according to some embodiments of the present disclosure.

FIG. 7 illustrates an example block diagram of training data 701 used to train an AI model 112 supporting tasks of different program codes, according to some embodiments of the present disclosure. The AI model 112 can be trained on multiple tasks for multiple program codes. This can allow the AI model 112 to produce an output (e.g., a single output) that can be used by different program codes to rank different content entities. In some examples, the AI model 112 can be trained using historical data from models (e.g., AI models that are different from AI model 112) used by the program codes. For example, the training data 701 can include historical contextual data 702, historical user data 704, and historical user interaction data 706 that were used as inputs as well as historical outputs 708 (e.g., rankings of content entities) of models for one or more program codes.

The AI model 112 can be trained on feedback (e.g., the training data 701) from the one or more program codes. In some examples, feedback r can be binary (e.g., $r \in \{0,1\}$) and can represent a user selection of a content entity that is displayed to a user. Since in some examples the feedback may only involve content entities that program codes have recommended to users, this may introduce selection bias or position bias in the training data 701. Different program codes providing the historical data may also have different biases. Therefore, the AI model 112 can be trained to evaluate point-wise loss functions 710. This may be more useful than a learning-to-rank algorithm that predicts relative ordering instead of relevance scores. The AI model 112 can be trained to predict the relevance score 302 for a given user by optimizing the following loss function 710:

$$L(w) = \sum\nolimits_{t=1}^{r} \sum\nolimits_{i} \hat{R}(i|x_c)^2 + \frac{c_t(i)}{p_t(i)}(c_t(i) - 2\hat{R}(i|x_t)) \quad \text{(Equation 1)}$$

where i denotes the content entity for which to compute the relevance score for a ranking request at time t, $\hat{R}(i|x_t)$ represents a regression estimate for the content entity i given its feature representation $x_t$, $c_t(i)$ represents an observed selection of the content entity by the user, and $p_t(i)$ represents a probability factor 712. The probability factor 712 can be associated with a bias in the training data 701, such as a bias associated with a content position or a content recommendation policy. The probability factor 712 can be adjusted to de-bias the training of the AI model 112. This can encode the bias for the content position of a content entity directly in the loss function 710 for training but can "zero" the bias out for evaluation and inference. Thus, the AI model 112 can learn the impact of the content position and its impact in relation to other features (e.g., historical contextual data 702) without having to learn content position biases for individual experiences (e.g., historical user interaction data 706).

The AI model 112 can be trained to optimize Equation 1 on the training data 701. The training data 701 includes, for each request at time t, a list of content entities to rank, where each content entity i is represented by a feature vector $x_t \in R^d$ in the feature space $F = F_c \cup F_p$ with dim(c)+dim(p)=d The feature set $F_c$ can be the historical contextual data 702 and the feature set $F_p$ can be the historical user data 704 and historical user interaction data 706. In some examples, the AI model 112 can first be trained only on $F_p$, which does not depend on contextual information. The AI model 112 can then be used in real-time to infer relevance scores defined as $$z = \phi(x_t^i),$$

where $$x_t^i$$

represents the content entity description with features in $F_p$. $\phi$ can be a non-linear transformation function learned from a neural network regressor. The relevance score z can then be output to program codes to control presentation layout of content entities.

In some examples, the feature set $F_p$ can be partitioned into multiple subsets $$\{F_p^i\},$$

where each subset $$\{F_p^i\}$$

represents a particular facet of historical data (e.g., historical contextual data 702, historical user interaction data 706, historical user data 704), such as historical playback history of a content entity, follows and likes for a content entity, etc. Each subset may represent a distinct facet of user preference, and falsely excluding a subset (such as user likes for content entities) may reduce user experience. To select optimal feature subsets, backward feature elimination can be performed. During each stage of training, hyper parameter optimization; (HPO) can be performed on AI models trained with different feature sets $$\left(\bigcup_{i \in S} F_p^i\right) - F_p^j, j \in S,$$

separately, where S is the subset of features determined by the previous step. Then, each AI model can be trained using the best-performing hyper parameter. Each AI model can be trained N times with random initialization, a randomly sub-sampled training set, and a randomly sub-sampled test set to account for randomness in the dataset, model initialization, and training. A feature subset may be eliminated only if the average performance of an AI model without the feature subset is superior.

Figure 8:
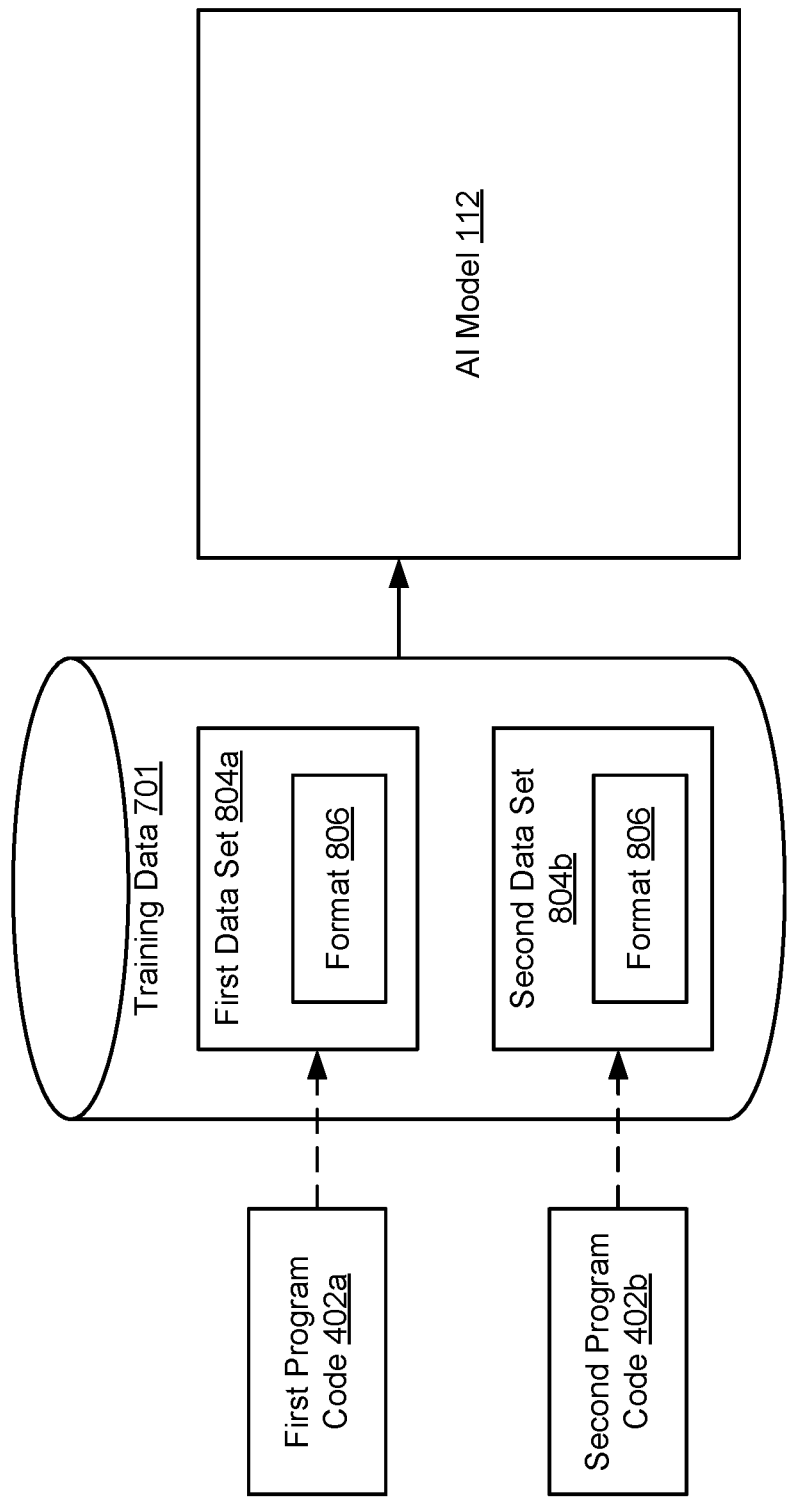
FIG. 8 illustrates an example block diagram of data sets used together to train an artificial intelligence model supporting tasks of different program codes, according to some embodiments of the present disclosure.

FIG. 8 illustrates an example block diagram of data sets 804a-b used together to train an AI model 112 supporting tasks of different program codes, according to some embodiments of the present disclosure. The training data 701 used to train the AI model 112 can include data sets originating from different program codes. For example, a first data set 804a can include historical data associated with the first program code 402a or its first program function, such as one or more of a previous user interaction with the first content function or with previous content output of the first program code 402a, previous contextual data associated with the previous user interaction, previous user data associated with the previous user interaction, a previous set of content entities on which the first program code 402a performed a first content function to determine the previous content output, a previous output of a model (e.g., an AI model that is different from the AI model 112) used by the first program code 402a to perform the first content function, and a presentation layout of the previous content output. A second data set 804b can include similar historical data from the second program code 402b.

The first data set 804a and the second data set 804b may be stored together as a single data set that is used to train the AI model 112. In this example, the first data set 804a and the second data set 804b may have the same format 806. In other examples, the first data set 804a and the second data set 804b may have different formats and the first program code 402a and the second program code 402b may be performing different tasks. Training the AI model 112 using both data sets 804a-b at once can allow the AI model 112 to generate predictions (e.g., relevance scores, embedding vectors, rankings) that can be used by both the first program code 402a and the second program code 402b.

Figure 9:
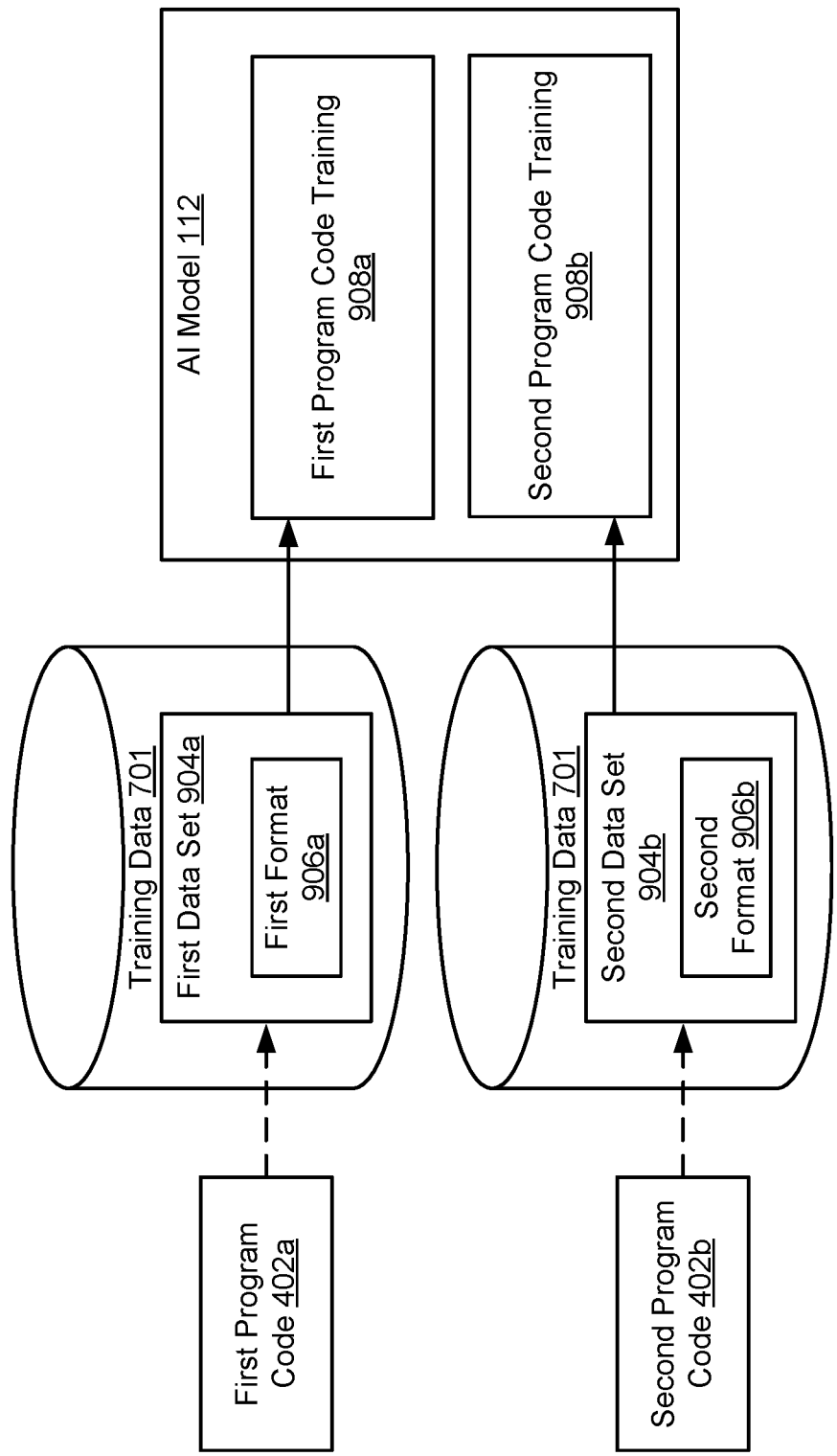
FIG. 9 illustrates an example block diagram of data sets used separately to train an artificial intelligence model supporting tasks of different program codes, according to some embodiments of the present disclosure.

FIG. 9 illustrates an example block diagram of data sets 904a-b used separately to train an AI model 112 supporting tasks of different program codes, according to some embodiments of the present disclosure. The training data 701 used to train the AI model 112 can include data sets originating from different program codes. For example, a first data set 904a can include historical data associated with the first program code 402a or its first program function, such as one or more of a previous user interaction with the first content function or with previous content output of the first program code 402a, previous contextual data associated with the previous user interaction, previous user data associated with the previous user interaction, a previous set of content entities on which the first program code 402a performed a first content function to determine the previous content output, a previous output of a model (e.g., an AI model that is different from the AI model 112) used by the first program code 402a to perform the first content function, and a presentation layout of the previous content output. A second data set 904b can include similar historical data from the second program code 402b.

Although both the first data set 904a and the second data set 904b are used as training data 701 to train the AI model 112, the first data set 904a and the second data set 904b may not be stored together or used in training together. For example, the first data set 904a may have a first format 906a and may be segmented from the second data set 904b, which may have a second format 906b that is different from the first format 906a. The AI model 112 may be trained sequentially. For example, a first program code training 908a may be performed in which the AI model 112 is trained on the first data set 904a to generate predictions for the first program code 402a. Additionally, a second program code training 908b may be performed in which the AI model 112 is trained on the second data set 904b to generate predictions for the second program code 402b. The AI model 112 may be trained to produce embedding vectors with multiple relevance scores, such as a first relevance score for the first program code 402a and a second relevance score for the second program code 402b.

Figure 10:
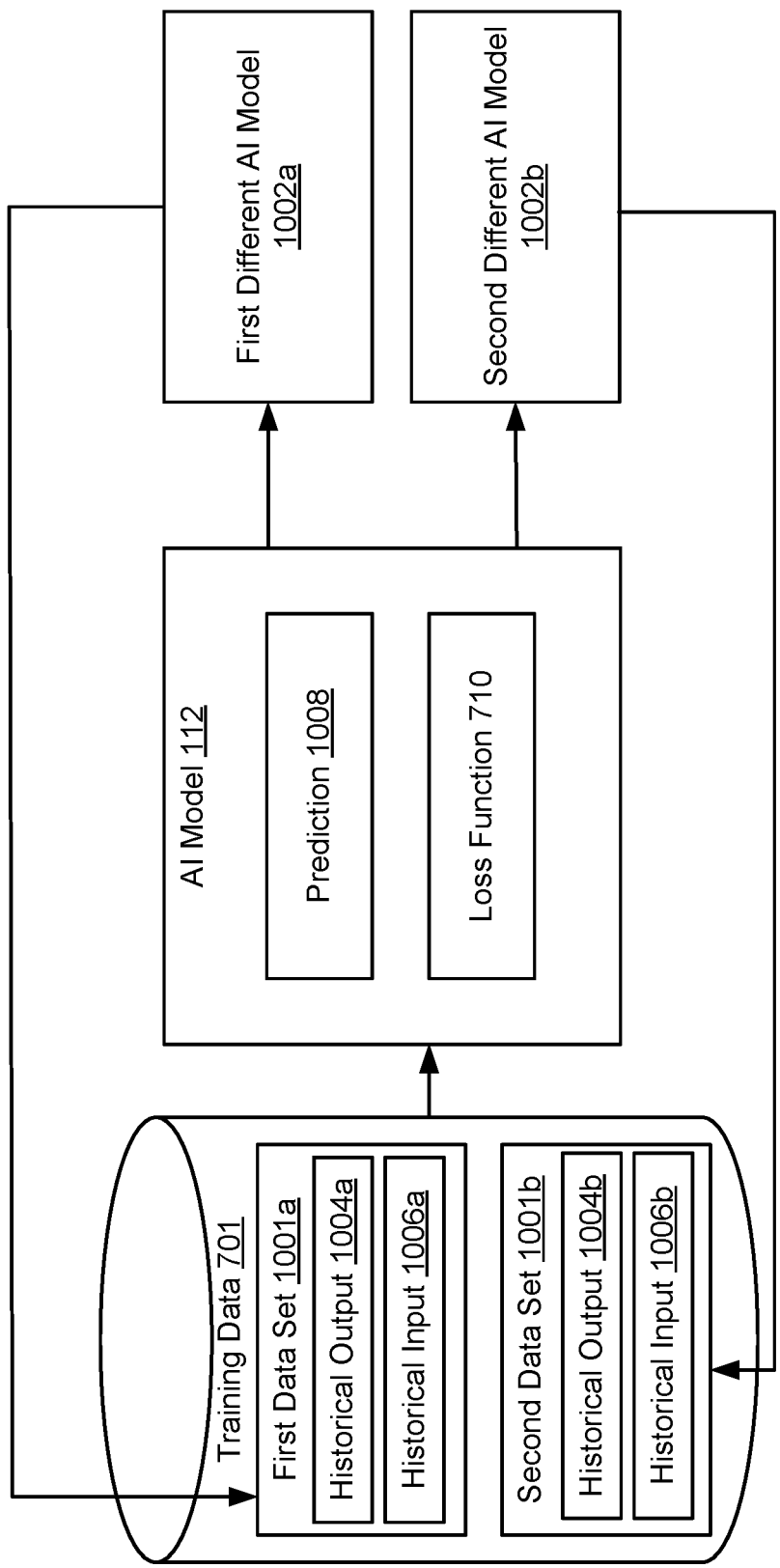
FIG. 10 illustrates an example block diagram of an artificial intelligence model trained using historical data from one or more downstream artificial intelligence models, according to some embodiments of the present disclosure.

FIG. 10 illustrates an example block diagram of an AI model 112 trained using historical data from one or more downstream AI models, according to some embodiments of the present disclosure. The downstream AI models may be, for example, a first different AI model 1002a used by the first program code to generate rankings of content entities and a second different AI model 1002b used by the second program code to generate rankings of content entities. In the example illustrated in FIG. 10, the AI model 112 may be trained separately from the different AI models 1002a-b. The AI model 112 can be trained offline with training data 701 that includes a first data set 1001a of first historical outputs 1004a (e.g., previous output) produced by the first different AI model 1002a in response to providing first historical inputs 1006a (e.g., previous input). The training data 701 can also include a second data set 1001b of second historical outputs 1004b (e.g., previous output) produced by the second different AI model 1002b in response to providing second historical inputs 1006b (e.g., previous input). The AI model 112 can be trained with the training data 701 to predict the historical outputs 1004a-b. That is, the historical outputs 1004a-b can be used as ground truth in training.

For example, the AI model 112 can be trained by providing the first historical input 1006a and the second historical input 1006b as input to the AI model 112. The AI model 112 can generate a prediction 1008 for the historical outputs 1004a-b using the loss function 710. The prediction 1008 can be compared to the first historical output 1004a and/or the second historical output 1004b. The AI model 112 can learn from the differences between the prediction 1008 and the historical outputs 1004a-b and the training can be repeated. After the AI model 112 is trained on the historical data from the different AI models 1002a-b, output generated by the AI model 112 can be provided to the first different AI model 1002a and/or the second different AI model 1002b to be used in generating rankings of content entities at runtime.

Figure 11:
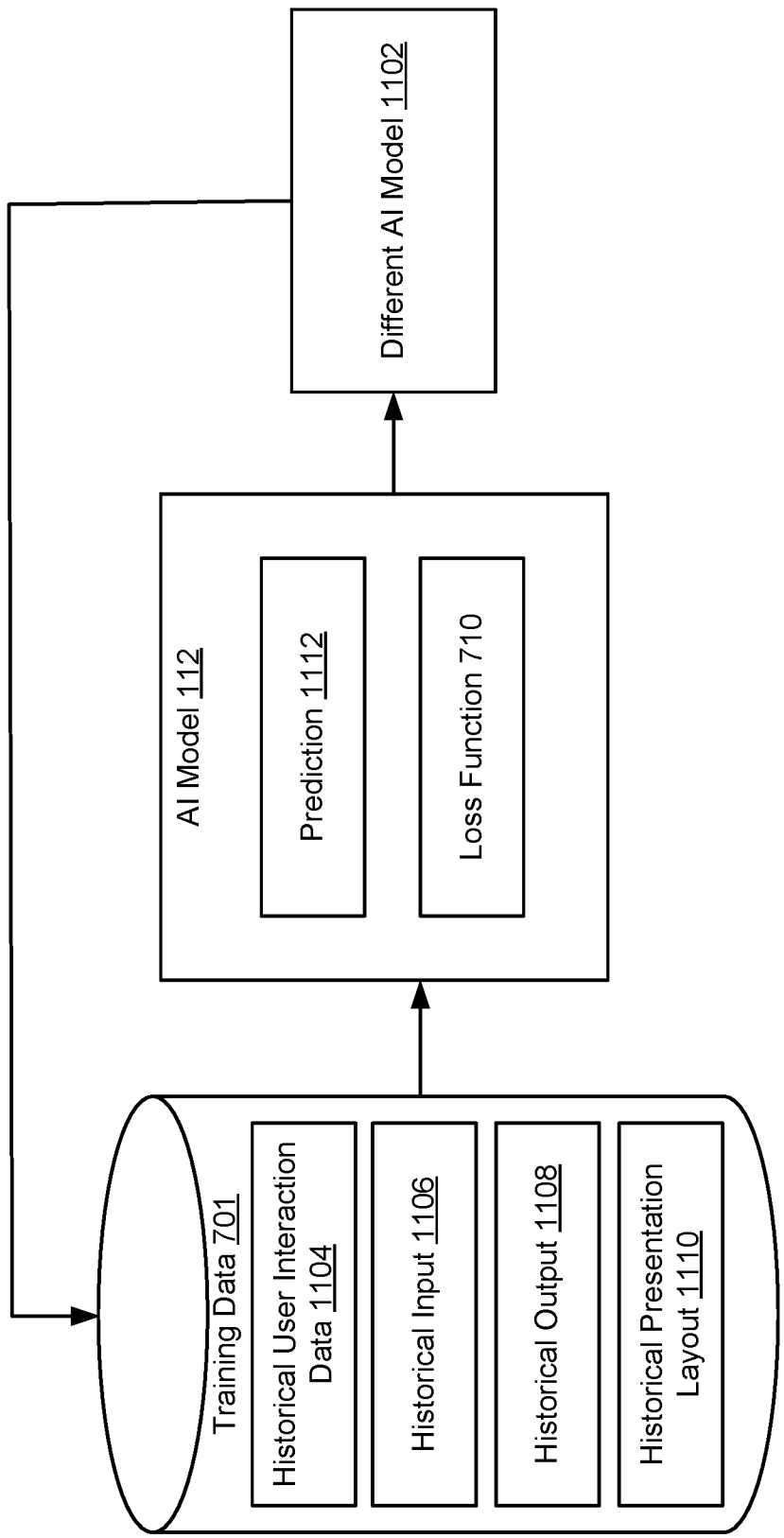
FIG. 11 illustrates another example block diagram of an artificial intelligence model trained using historical data from one or more downstream artificial intelligence models, according to some embodiments of the present disclosure.

FIG. 11 illustrates another example block diagram of an AI model 112 trained using historical data from one or more downstream AI models, according to some embodiments of the present disclosure. The downstream AI model can be the different AI model 1102 used by one of the program codes (e.g., first program code 402a or second program code 402b of FIG. 4) to generate rankings of content entities. In the example illustrated in FIG. 11, the AI model 112 may be trained separately from or together with the different AI model 1102. The AI model 112 can be trained with training data 701 that includes historical input 1006 (e.g., previous input to the different AI model 1102), historical output 1108 (e.g., previous output) generated by the different AI model 1102 in response to the historical output 1108, historical presentation layout 1110 by the program code of the content entities (e.g., the ranking order in which the content entities were displayed on a user interface), and historical user interaction data 1104 indicating a previous user interaction with the content entities displayed according to the historical presentation layout 1110. The AI model 112 can be trained with the training data 701 to predict the historical user interaction data 1104. That is, the historical user interaction data 1104 can be used as ground truth in training.

For example, the AI model 112 can be trained by providing the historical input 1106, the historical output 1108, and the historical presentation layout 1110 as input to the AI model 112. The AI model 112 can generate a prediction 1112 of the historical user interaction data 1104 using the loss function 710. The prediction 1112 can be compared to the historical user interaction data 1104. The AI model 112 can learn from the difference between the prediction 1112 and the historical user interaction data 1104 and the training can be repeated. After the AI model 112 is trained, output generated by the AI model 112 can be provided to the different AI model 1102 to be used by the program code in generating ranking of content entities at runtime.

Figure 12:
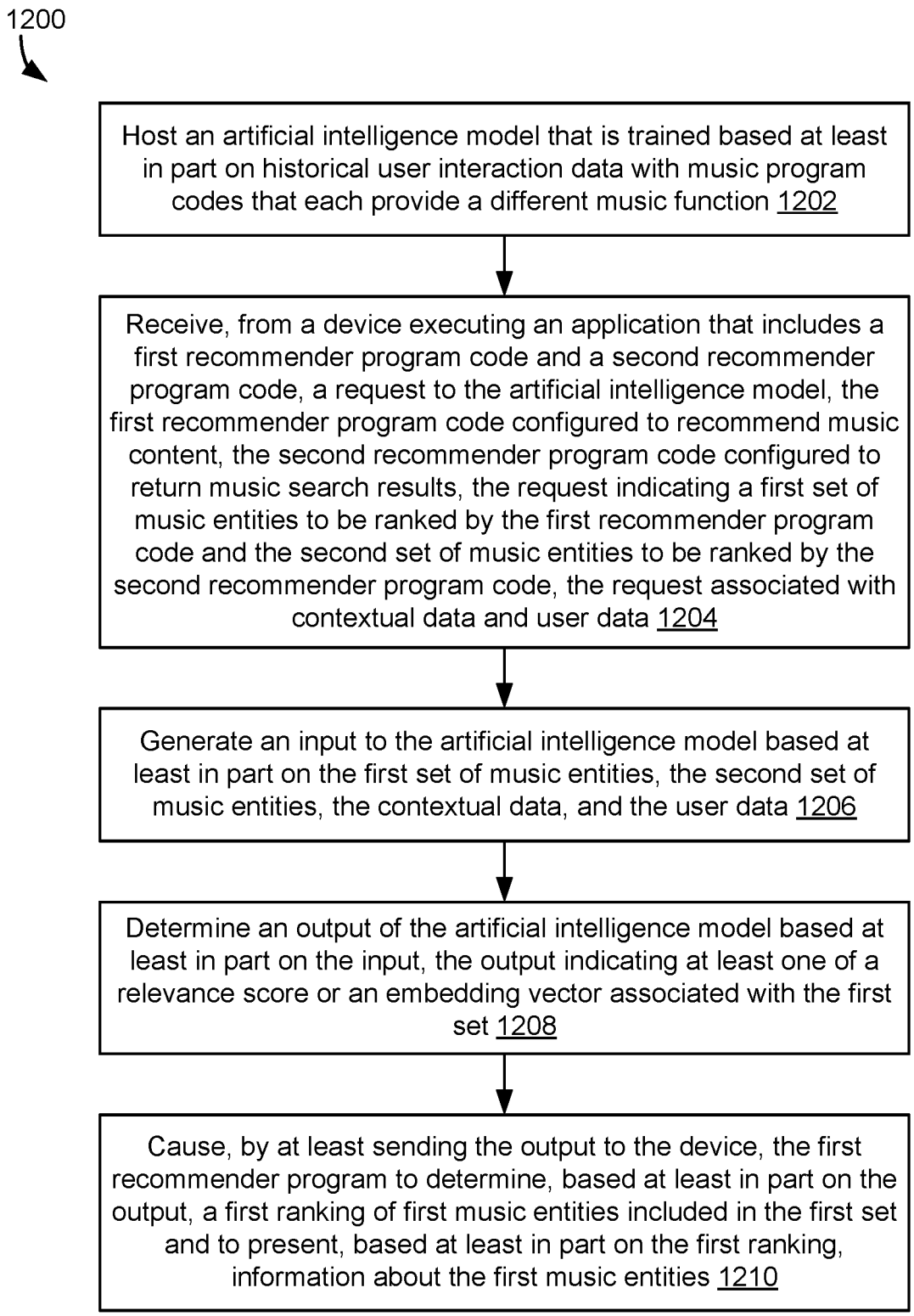
FIG. 12 illustrates an example flow for using an artificial intelligence model to support tasks of different program codes, according to some embodiments of the present disclosure.

FIG. 12 illustrates an example flow for using an artificial intelligence model to support tasks of different program codes, according to some embodiments of the present disclosure. This process is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In some examples, the device 102, the computer system 104, a user device 1302, a web server 1306, and/or an application server 1308 may perform the flow 1200 of FIG. 12.

In an example, the flow 1200 may include operation 1202, where a computer system may host an artificial intelligence (AI) model that is trained based at least in part on historical user interaction data with program codes (e.g., music program codes) that each provide a different music function. The AI model may be trained based at least in part on training data that includes the historical user interaction data, historical contextual data, historical user data, and historical outputs of a different artificial intelligence model used by a first program code (e.g., a first recommender program code) in association with performing a first content function. In some examples, the AI model may be trained based at least in part on training data and a loss function. Bias in the training data associated with a content position or a content recommendation policy may be associated with a probability factor in the loss function.

In some examples, the training data may include a plurality of data sets, such as a first data set associated with the first content function and a second data set associated with a second content function performed by a second program code (e.g., a second recommender program code). In some examples, the first data set may indicate a previous user previous user interaction with the first content function or with a previous content output of the first program code, previous contextual data associated with the previous user interaction, previous user data associated with the previous user interaction, a previous set of content entities on which the first content function was performed to determine the previous content output, a previous output of a different artificial intelligence model used by the first program code to perform the first content function, and a presentation layout of the previous content output. In some examples, the first data set may indicate a first previous output of the first different artificial intelligence model used by the first recommender program code to perform the first function. The second data set may indicate a second previous output of a second different artificial intelligence model used by the second recommender program code to perform the second content function. The AI model may be trained to predict the first previous output and the second previous output.

In an example, the flow 1200 may include operation 1204, where the computer system can receive, from a device executing an application that includes the first recommender program code and the second recommender program code, a request to the AI model. In some examples, the first recommender program code can recommend music content and the second recommender program code can return music search results. The request can indicate a first set of music entities to be ranked by the first recommender program code and a second set of music entities to be ranked by the second recommender program code. The request can be associated with contextual data and user data. In some examples, the request can be received via an application programming interface (API) call from the device.

In an example, the flow 1200 may include operation 1206, where the computer system can generate an input to the AI model based at least in part on the first set of music entities, the second set of music entities, the contextual data, and the user data. In some examples, generating the input can involve generating a first input based at least in part on one of the first set of music entities, contextual data, and user data. Generating the input can also involve generating a second input based at least in part on a different one of the first set of music entities, the contextual data, and the user data.

In an example, the flow 1200 may include operation 1208, where the computer system can determine an output of the AI model based at least in part on the input. The output can indicate at least one of a relevance score or an embedding vector associated with the first set. In some examples, the output can further indicate a first ranking and a second ranking of second music entities included in the second set. Thus, the first recommender program code can use the first ranking to recommend the music content, and the second recommender program code can use the second ranking to return the music search results. In some examples, the output can include at least one of the relevance score or the embedding vector.

In some examples, determining the output can involve generating, during an offline time period, a first output in response to the first input. During runtime, a second output can be determined in response to the second input. Additionally, during the runtime, the output can be generated by at least combining the first output and the second output.

In an example, the flow 1200 may include operation 12010, where the computer system can cause, by at least sending the output to the device, the first recommender program to determine, based at least in part on the output, the first ranking of first music entities included in the first set and to present, based at least in part on the first ranking, information about the first music entities. For example, the first recommender program code can arrange the first music entities in a presentation layout based at least in part on the first ranking.

In some examples, the output can be sent to the device executing the application, and the output can be stored in a memory (e.g., of the device or any other computing system). Then, the second program recommender code can retrieve the output from the memory to perform a second content function. In some examples, the computer system can cause the second program recommender code to perform, based at least in part on the output, the first content function on the second set of music entities and to present the second set of music entities based at least in part on the second content function.

In some examples, the first ranking can be determined based at least in part on the at least one of the relevance score or the embedding vector being input, along with the contextual data and the user data, to the first different artificial intelligence model associated with the first recommender program code.

Figure 13:
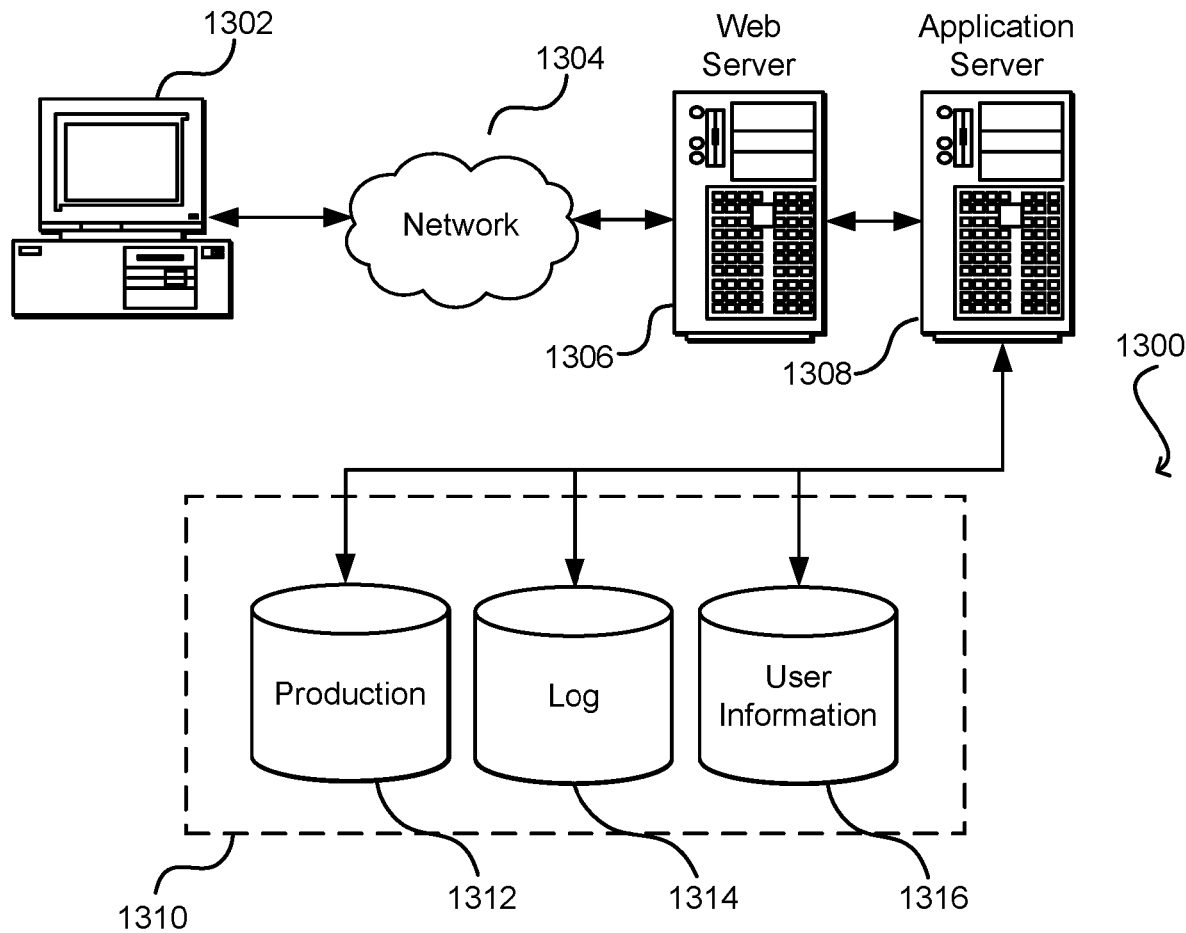
FIG. 13 illustrates an environment in which various embodiments can be implemented.

FIG. 13 illustrates an environment 1300 in which various embodiments can be implemented. As will be appreciated, although a Web-based environment is used for purposes of explanation, different environments may be used, as appropriate, to implement various embodiments. The environment includes a user device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer system comprising:
one or more processors; and
one or more memory storing instructions that, upon execution by the one or more processors, configure the computer system to:
host an artificial intelligence model that is trained based at least in part on historical user interaction data with a plurality of music program codes each providing a different music function;
receive, from a device executing an application that includes a first recommender program code and a second recommender program code, a request to the artificial intelligence model, the first recommender program code configured to recommend music content, the second recommender program code configured to return music search results for a separate presentation than that of the music content recommended by the first recommender program code, the request indicating a first set of music entities to be ranked by the first recommender program code and a second set of music entities to be ranked by the second recommender program code, the request associated with contextual data and user data;
generate a first input to the artificial intelligence model based at least in part on the first set of music entities, the second set of music entities, the contextual data, and the user data;
determine an output of the artificial intelligence model based at least in part on the first input, the output indicating at least one of a relevance score or an embedding vector associated with the first set; and cause, by at least sending the output to the device to be used at least as a second input to the first recommender program code, the first recommender program code to determine, based at least in part on the output, a first ranking of first music entities included in the first set and to present, based at least in part on the first ranking, information about the first music entities.

2. The computer system of claim 1, wherein the output further indicates the first ranking and a second ranking of second music entities included in the second set such that the first recommender program code uses the first ranking to recommend the music content and such that the second recommender program code uses the second ranking to return the music search results.

3. The computer system of claim 1, wherein the output includes the at least one of the relevance score or the embedding vector, and wherein the first ranking is determined based at least in part on the at least one of the relevance score or the embedding vector being input along with the contextual data and the user data to a different artificial intelligence model associated with the first recommender program code.

4. The computer system of claim 3, wherein the artificial intelligence model is trained based at least in part on training data that includes the historical user interaction data, historical contextual data, historical user data, and historical outputs of the different artificial intelligence model.

5. A computer-implemented method comprising:
  determining a request of an application that is executing on a device and that includes a first program code and a second program code, the first program code configured to provide a first content function and present first content at a user interface of the application, the second program code configured to provide a second content function different from the first content function and present second content at the user interface separately from a presentation of the first content, the request associated with contextual data and user data and indicating a first set of content entities associated with the first program code;
  generating a first input to an artificial intelligence model based at least in part on the first set, the contextual data, and the user data, the artificial intelligence model trained based at least in part on historical user interaction data associated with the first content function of the first program code and the second content function of the second program code;
  determining an output of the artificial intelligence model based at least in part on the first input, the output indicating at least one of a relevance score or an embedding vector associated with the first set; and
  causing the first program code to perform, based at least in part on the output being used as a second input to the first program code, the first content function on the first set of content entities and present the first content based at least in part on the first content function.

6. The computer-implemented method of claim 5, further comprising:
  hosting the artificial intelligence model, wherein the request is received via an application programming interface (API) call from the device, wherein the first program code is a first recommender program code configured to recommend music content, wherein the second program code is a second recommender program code configured to return music search results, and wherein performing the first content function comprises determining a ranking of music entities included in the first set.

7. The computer-implemented method of claim 5, further comprising:
  training the artificial intelligence model based at least in part on training data, the training data generated based at least in part on the historical user interaction data, historical contextual data, historical user data, and historical outputs of a different artificial intelligence model used by the first program code in association with performing the first content function.

8. The computer-implemented method of claim 5, further comprising:
  causing the second program code to perform, based at least in part on the output, the first content function on a second set of content entities and present the second content based at least in part on the second content function, wherein the output includes the relevance score or the embedding vector, and wherein each of the first content function and the second content function is performed based at least in part on the relevance score or the embedding vector.

9. The computer-implemented method of claim 5, wherein causing the first program code to perform the first content function comprising providing the at least one of the relevance score or the embedding vector to the first program code, wherein the first content function is performed based at least in part on a different input to a different artificial intelligence model, wherein the different input includes the at least one of the relevance score or the embedding vector.

10. The computer-implemented method of claim 5, wherein causing the first program code to perform the first content function comprising providing a ranking of first content entities included in the first set to the first program code, wherein the first content function including arranging the first content entities in a presentation layout based at least in part on the ranking.

11. The computer-implemented method of claim 5, wherein causing the first program code to perform the first content function comprising sending the output to the device executing the application, wherein the output is stored in a memory and is retrieved by the second program code from the memory to perform the second content function.

12. The computer-implemented method of claim 5, wherein generating the first input comprises:
  generating a third input based at least in part on one of the first set, the contextual data, and the user data; and
  generating a fourth input based at least in part on a different one of the first set, the contextual data, and the user data, and
  wherein determining the output comprises:
  generating, during an offline time period, a first output in response to the third input;
  determining, during runtime, a second output in response to the fourth input; and
  generating, during the runtime, the output by at least combining the first output and the second output.

13. One or more non-transitory computer-readable storage media storing instructions that, upon execution on a computer system, cause the computer system to perform operations comprising:
  determining a request of an application that is executing on a device and that includes a first program code and a second program code, the first program code configured to provide a first content function and present first content at a user interface of the application, the second program code configured to provide a second content function different from the first content function and present second content at the user interface separately from a presentation of the first content, the request associated with contextual data and user data and indicating a first set of content entities associated with the first program code;

generating a first input to an artificial intelligence model based at least in part on the first set, the contextual data, and the user data, the artificial intelligence model trained based at least in part on historical user interaction data associated with the first content function of the first program code and the second content function of the second program code;

determining an output of the artificial intelligence model based at least in part on the first input, the output indicating at least one of a relevance score or an embedding vector associated with the first set; and causing the first program code to perform, based at least in part on the output being used as a second input to the first program code, the first content function on the first set of content entities and present the first content based at least in part on the first content function.

14. The one or more non-transitory computer-readable storage media of claim 13, wherein the artificial intelligence model is trained based at least in part on training data that includes a plurality of data sets, wherein a first data set of the training data is associated with the first content function, and wherein a second data set of the training data is associated with the second content function.

15. The one or more non-transitory computer-readable storage media of claim 14, wherein the first data set indicates a previous user interaction with the first content function or with a previous content output of the first program code, previous contextual data associated with the previous user interaction, previous user data associated with the previous user interaction, a previous set of content entities on which the first content function was performed to determine the previous content output, a previous output of a different artificial intelligence model used by the first program code to perform the first content function, and a presentation layout of the previous content output.

16. The one or more non-transitory computer-readable storage media of claim 14, wherein the first data set indicates a first previous output of a first different artificial intelligence model used by the first program code to perform the first content function, wherein the second data set indicates a second previous output of a second different artificial intelligence model used by the second program code to perform the second content function, and wherein the artificial intelligence model is trained to predict the first previous output and the second previous output.

17. The one or more non-transitory computer-readable storage media of claim 14, wherein the first data set indicates a previous output of a different artificial intelligence model used by the first program code to perform the first content function and generate a previous content output, wherein the first data set further indicates a previous user interaction with the first content function or with the previous content output, and wherein the artificial intelligence model is trained by at least using the previous output as an input to predict the previous user interaction.

18. The one or more non-transitory computer-readable storage media of claim 14, wherein the first data set and the second data set have a common data format and are input to the artificial intelligence model during training such that the artificial intelligence model is trained jointly on the first data set and the second data set to generate predictions usable by the first program code and the second program code.

19. The one or more non-transitory computer-readable storage media of claim 14, wherein the training data segments the first data set and the second data set such that the first data set is input to the artificial intelligence model during first training associated with the first content function and such that the second data set is input to the artificial intelligence model during second training associated with the second content function.

20. The one or more non-transitory computer-readable storage media of claim 13, wherein the operations further comprise:

training the artificial intelligence model based at least in part on training data and a loss function, wherein bias in the training data associated with a content position or a content recommendation policy is associated with a probability factor in the loss function.

\* \* \* \* \*